United States Patent
Blanford et al.

(10) Patent No.: US 7,070,097 B2
(45) Date of Patent: Jul. 4, 2006

(54) SETTLED WEIGHT SCALE FOR A CHECKOUT SYSTEM

(75) Inventors: Denis M. Blanford, Duluth, GA (US); Craig E. Maddox, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 523 days.

(21) Appl. No.: 10/034,536

(22) Filed: Dec. 27, 2001

(65) Prior Publication Data

US 2003/0121974 A1 Jul. 3, 2003

(51) Int. Cl.
*G06K 15/00* (2006.01)

(52) U.S. Cl. ............... 235/383; 235/375; 235/380; 235/385; 705/1; 705/23; 705/61; 186/59

(58) Field of Classification Search ............... 235/383, 235/375, 385, 380; 705/1, 23, 21, 61; 186/61, 186/59
See application file for complete search history.

(56) References Cited

U.S. PATENT DOCUMENTS

| | | | |
|---|---|---|---|
| 4,940,116 A | 7/1990 | O'Connor et al. | |
| 5,115,888 A * | 5/1992 | Schneider | 186/61 |
| 5,125,465 A | 6/1992 | Schneider | |
| 5,426,282 A | 6/1995 | Humble | |
| 5,494,136 A * | 2/1996 | Humble | 186/61 |
| 5,640,002 A * | 6/1997 | Ruppert et al. | 235/462.46 |
| 5,967,264 A * | 10/1999 | Lutz et al. | 186/61 |
| 6,145,629 A * | 11/2000 | Addy | 186/61 |
| 6,215,078 B1 * | 4/2001 | Torres et al. | 235/383 |
| 6,382,357 B1 * | 5/2002 | Morrison et al. | 186/61 |
| 6,592,033 B1 * | 7/2003 | Jennings et al. | 235/385 |
| 2002/0007281 A1 * | 1/2002 | Gil et al. | 705/1 |
| 2002/0194074 A1 * | 12/2002 | Jacobs | 705/16 |
| 2003/0009389 A1 * | 1/2003 | Purvis | 705/26 |
| 2003/0024982 A1 * | 2/2003 | Bellis et al. | 235/383 |
| 2003/0047387 A1 * | 3/2003 | Bogat | 186/59 |
| 2003/0083944 A1 * | 5/2003 | Duvall et al. | 705/21 |

FOREIGN PATENT DOCUMENTS

EP 0388560 A 9/1990

* cited by examiner

*Primary Examiner*—Karl D. Frech
*Assistant Examiner*—Allyson N Trail
(74) *Attorney, Agent, or Firm*—Maginot, Moore & Beck LLP; Paul W. Martin

(57) ABSTRACT

A retail terminal includes a scale for weighing items to be purchased. The scale is operative to obtain a settled or stable weight of items placed thereon either after a predetermined time delay from when the items were placed on the scale or the receipt of an actuation signal from a trigger or actuator. This allows time for the scanning of an item of the items on the scale via a scanner of the retail terminal generally associated with the lifting of the item from the scale in order for the item to be scanned.

16 Claims, 8 Drawing Sheets

SETTLED WEIGHT SCALE FOR A CHECKOUT SYSTEM

BACKGROUND

1. Field of the Invention

The present invention relates generally to checkout systems for retail businesses and, more particularly, to a checkout system having a scale for weighing objects for purchase.

2. Background Information

General merchandise stores and retail grocery, supermarket, or food stores utilize retail purchase transaction terminals or checkout systems such as assisted and non-assisted (self) checkout systems (collectively, checkout systems) to consummate the purchase transaction. These checkout systems generally include a scale for weighing produce and other items that are sold on the basis of weight. The scale measures weight of an item or multiple items for the checkout system to calculate a total price. An example of multiple items is a bunch of bananas or a bag of apples.

These checkout systems also typically include a scanner that is operative to read a bar code or uniform product code (UPC) that is on the item or at least one of the items. The bar code is used to identify the item(s) or contents of a bag of items. Once an item is scanned, the checkout system then knows to interrogate the scale to obtain a settled weight.

However, in the case of multiple items or a bag of items, typically the items or bag of items is placed on the scale while one of the items is lifted or removed so that its bar code can be read by the scanner. Almost immediately after the bar code is read, the checkout system interrogates the scale to obtain a weight of the items. The obtained weight is then used to calculate price. Since the items or bag of items is one item short, the obtained weight is not accurate.

It would thus be advantageous to have a checkout system that alleviates the above-noted shortcomings and/or problems in current checkout systems.

What is therefore needed is a checkout system that overcomes one or more of the above-mentioned drawbacks. What is particularly needed is a checkout system that implements weighing of items in a more effective manner than the prior art.

SUMMARY

In one form, the subject invention is a retail terminal having a settled weight detector and a method of checkout utilizing the settled weight detector. Particularly, the subject invention provides a scale/actuator with a triggering device that causes the settled weight detector to hold the settled weight in the settled weight detector until all objects are known to be on the scale platter.

In another form, the subject invention is a retail terminal having a settled weight detector which provides a trigger or actuator signal sent to the retail terminal to indicate when the settled weight on the weight detector contains all objects to be weighed.

In accordance with an aspect of the subject invention, there is provided a method of operating a retail terminal. The method includes the steps of: (a) allowing placement of items to be weighed on a scale of the retail terminal; (b) allowing scanning of one item of the items via a scanner of the retail terminal; (c) obtaining a first weight measurement of the items on the scale upon successful scanning of the one item; and (d) obtaining a second weight measurement of the items on the scale upon actuation of a trigger.

In accordance with another aspect of the subject invention, there is provided a retail terminal. The retail terminal includes a processor, memory in communication with the processor and containing program instructions operative to control the processor, a scale in communication with the processor, and a scanner in communication with the processor. The scale is operative in conjunction to obtain a first weight measurement of items placed on the scale. The scanner is further operative to obtain machine-readable data from one of the items. The scale is yet further operative to obtain a second weight measurement of the items on the scale upon receipt of a trigger signal.

In accordance with yet another aspect of the subject invention, there is provided a checkout system. The checkout system includes a processor, a scale in communication with the processor and operative to obtain weight measurement of items placed on the scale, a scanner in communication with the processor and operative to read bar codes, and memory in communication with the processor and containing program instructions. The program instructions, when executed by the processor, causes the processor to: (a) obtain a first weight measurement from the scale of items placed on the scale; (b) obtain a bar code associated with one of the items from the scanner; and (c) obtain a second weight measurement from the scale of the items placed on the scale upon actuation of a trigger.

BRIEF DESCRIPTION OF THE DRAWINGS

Corresponding reference characters indicate corresponding parts throughout the several views.

DETAILED DESCRIPTION OF THE INVENTION

Figure 1:
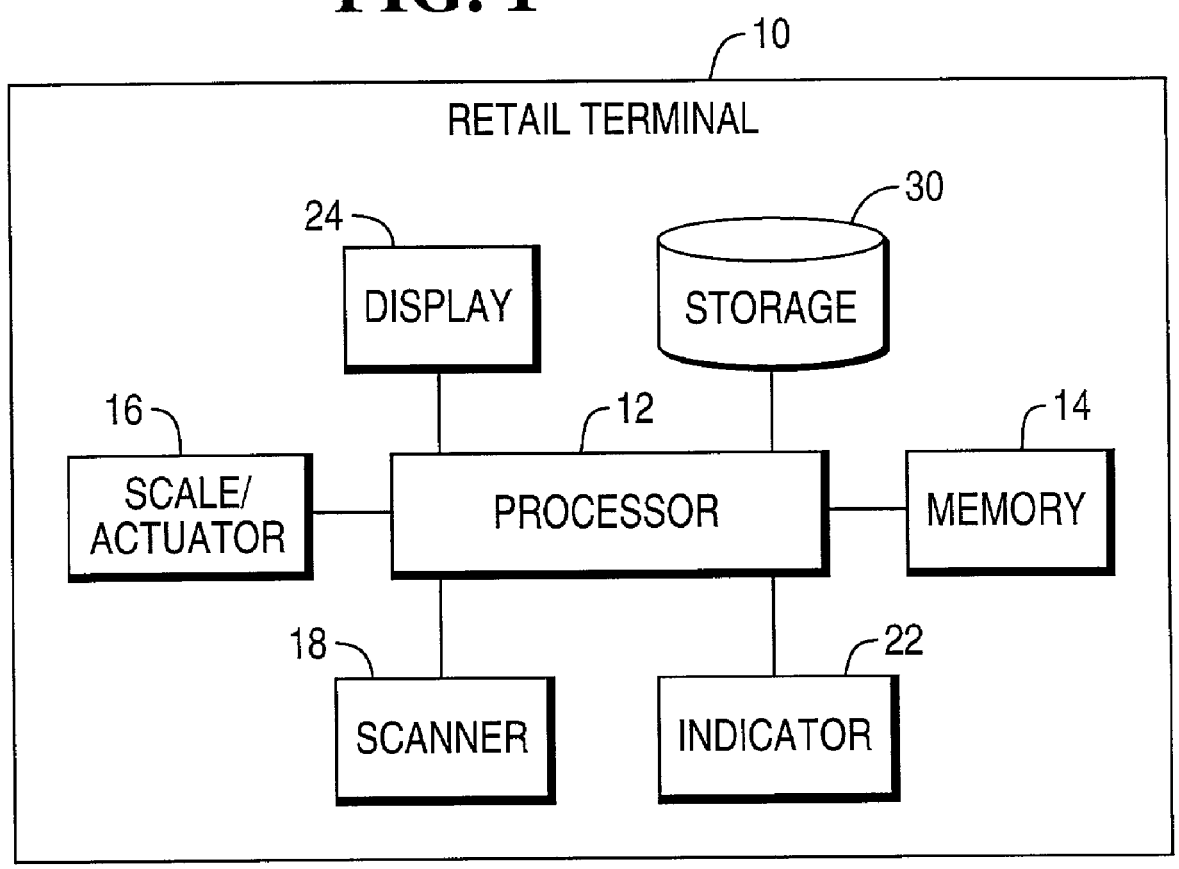
FIG. 1 is a block diagram of an embodiment of an exemplary retail terminal embodying the subject invention.

Referring to FIG. 1, there is depicted a block diagram of an exemplary retail terminal, generally designated 10, in which the subject invention may be embodied. The retail terminal 10 is representative of any type of retail terminal such as a kiosk, a point-of-service (POS) terminal, an assisted checkout system/terminal, a self-checkout system/terminal, or the like (collectively, retail terminal).

The retail terminal 10 includes a processor, processing unit, processing circuitry/logic or the like (collectively, processor) 12, memory 14, a scale/actuator 16, a scanner 18, an indicator 22, a display 24, and storage 30 (collectively, retail terminal components). It should be appreciated that while the retail terminal components are shown in FIG. 1 as "within" the retail terminal 10, some of the retail terminal components may be physically located at a distance to a retail terminal structure. Thus the block diagram of the retail terminal 10 represents those retail terminal components associated with the operation of a retail terminal in accordance with the principles of the subject invention. For example, the storage 30 may be located in a system server to which the retail terminal 10 is in communication. This would allow a plurality of retail terminals to utilize the storage 30 as well as provide a common storage for databases, look-up tables, and the like. If any such retail terminal component is physically remote from the retail terminal 10, it is inherent that the retail terminal 10 and the component are in communication via a network (wireless or wired) or any other type of communication medium.

The memory 14 of the retail terminal 10 may be any type of memory such as, without being exhaustive, RAM, ROM, EEPROM, DRAM, SDRAM, or the like, that is operative to either permanently or temporarily store program instructions (software) for the operation of the retail terminal 10 and/or the various retail terminal components. The memory 14 is in communication with the processor 12 such that the processor may execute the program instructions stored therein for operation of the retail terminal 10 in the manner set forth herein.

The scale/actuator 16 is in communication with the processor 12 and is operative, in one mode, to obtain weight of an item or items placed thereon. In the weight-obtaining mode, the scale/actuator 16 is operative to obtain weight once, periodically, or continuously. In a single weight-obtaining mode, the scale measures weight and provides the obtained weight measurement to the processor 12. In a periodic weight-obtaining mode, the scale/actuator 16 is operative to obtain weight a given number of times (sampled) during a given period of time and provide the obtained measurements to the processor 12. The given number of times that the scale/actuator 16 samples weight is adjustable as well as the given period of time in which the scale/actuator 16 obtains the weight. In a continuous weight-obtaining mode, the scale/actuator 16 is operative to continuously measure weight and supply the measurements to the processor 12. When the scale/actuator 16 receives the trigger signal, the weight as measured by the scale/actuator 16 is utilized as the stable or settled weight for price calculation of the items on the scale/actuator 16.

The scanner 18 is in communication with the processor 12 and is operative to read machine-readable indicia on an item. The machine-readable indicia may be a bar code such as a UPC (Uniform Product Code), or the like. The scanner is further operative to provide data regarding the machine-readable indicia on the item to the processor 12. The scanner 18 is preferably a continuous read type scanner that is operative to read machine-readable indicia on a continuous basis. The scanner 16 provides scan data to the processor 12 after a valid reading of the bar code. The processor 12, in communication with the storage 30, accesses product databases and look-up tables therein, to ascertain whether a weight must necessarily be obtained for the items, price or pricing information, product information and the like (collectively, product data).

The processor 12 is operative to receive weight measurement(s) from the scale/actuator 16, the bar code data from the scanner 18, product data from the storage 30, program instructions from the memory 14. The processor 12 is further operative to provide an indicator signal to the indicator 22. The indicator signal allows the indicator 22 to provide an audio and/or visual indication to a user of the retail terminal 10 that there has been successful scaling (i.e. that a successful settled or stable weight has been obtained). Successful scaling will be described in greater detail below. The indicator 22 may be a light, a sound, or a combination of light and sound. The indicator 22 may be a stand-alone device or may be incorporated into another device such as the display 24.

The scale/actuator 16 is operative to wait a specified time to obtain a weight data/measurement from the scale/actuator 16 regarding an item or items placed thereon rather than at the moment (or very near the moment) that a weight is stable or placed thereon. Particularly, the scale/actuator 16 is operative to wait until either a trigger or actuation signal is received or a predetermined time length or duration has elapsed (a timer) after the items have been placed on the scale/actuator 16 to obtain a stable weight measurement. The stable weight measurement is then sent to the processor 10 to be processed according to the product data from the storage 30 and the program instructions. An indication is then made via the indicator 22 when a stable weight measurement is successfully processed.

The trigger or actuator providing a trigger or actuation signal in the embodiment of FIG. 1 is integral with the scale 16. Particularly, in one form, the scale/actuator 16 is further operative to provide an actuation signal when the scale/actuator 16 detects or measures a weight change after an initial weight measurement of items placed thereon. The weight change must be more than trivial in order to avoid insignificant weight changes to trigger an actuation signal. The weight change value is adjustable in the scale/actuator 16. The actuation signal is received by the scale/actuator 16, which then obtains a weight measurement or utilizes the current weight measurement from the scale/actuator 16. The final weight measurement represents a settled or stable weight of all items. The weight measurement is then processed accordingly. A weight change may be provided by a user or assistant tapping or otherwise manually triggering the scale.

When items are placed on the scale/actuator 16, a timer is also preferably started via the program instructions. The time length or duration of the timer is adjustable. As such, the timer may be adjusted according to whatever criterion or criteria is deemed appropriate. For example, the timer may be of a length of an average amount of time necessary to lift an object from the scale, scan the object, and return the object back onto the scale. Expiration of the timer provides an alternative trigger or actuation signal to the scale/actuator 16 to obtain a settled weight. The timer may thus be used to default the retail terminal 10 into obtaining a settled weight in the case that an actuation signal is not obtained by a weight change.

Figure 2B:
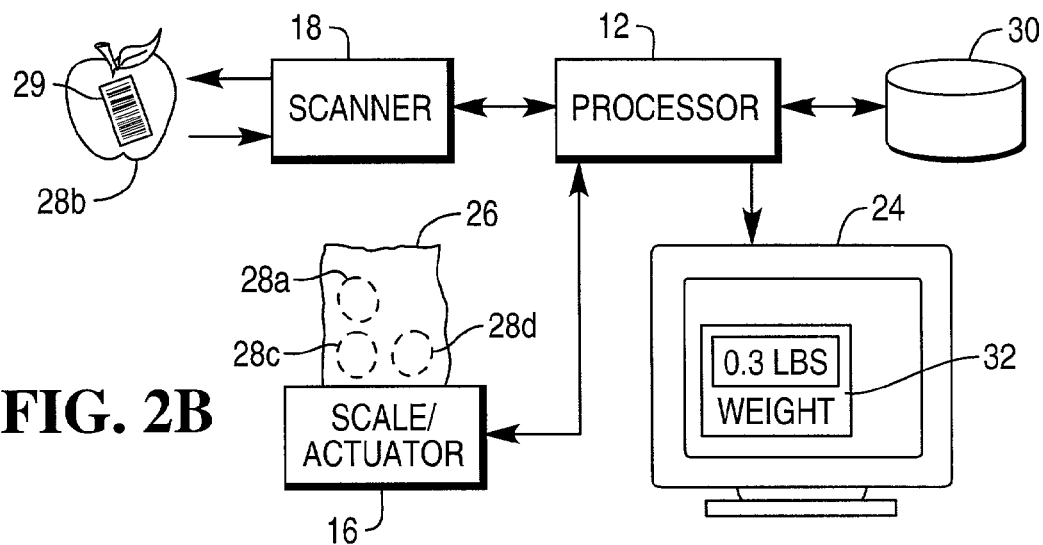
FIG. 2B is a representation of an intermediary step in obtaining a stable or settled weight of a plurality of items considered as one item in accordance with the principles of the subject invention per the embodiment of FIG. 1.
Figure 2C:
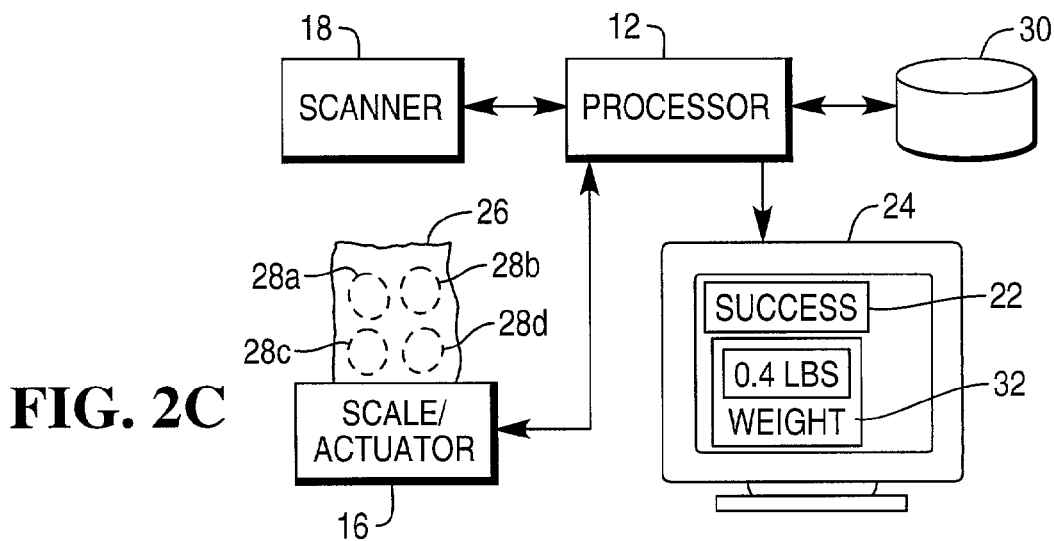
FIG. 2C is a representation of a final step in obtaining a stable or settled weight of a plurality of items considered as one item in accordance with the principles of the subject invention per the embodiment of FIG. 1.
Figure 2A:
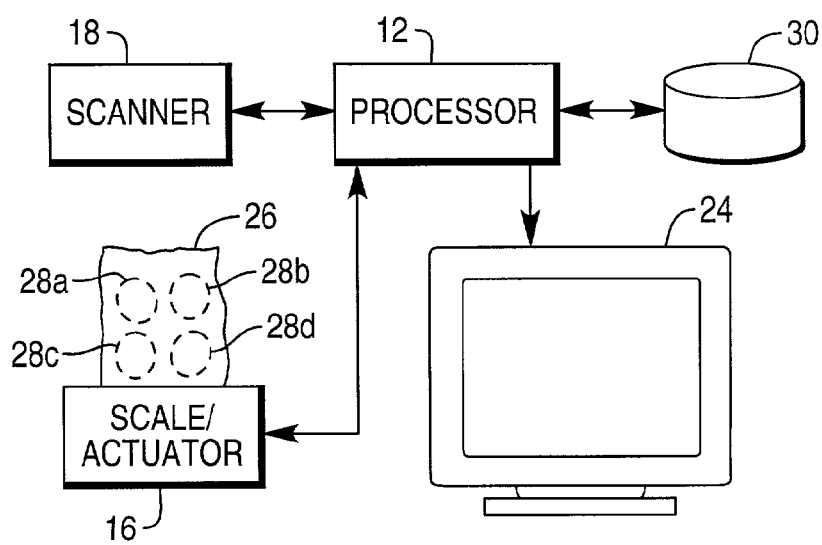
FIG. 2A is a representation of a first step in obtaining a stable or settled weight of a plurality of items considered as one item in accordance with the principles of the subject invention per the embodiment of FIG. 1.

Referring to FIGS. 2A, 2B, and 2C, an exemplary manner of operation of the principles of the subject invention with respect to the retail terminal 10 of FIG. 1 will be described. In FIG. 2A, a bag 26 of items 28a, 28b, 28c, and 28d, to be purchased is placed on the scale/actuator 16. The items 28a, 28b, 28c, and 28d are typically produce or other items that are sold on the basis of weight. Substantially immediately after the bag 26 is placed on the scale/actuator 16, the scale/actuator 16 provides a weight or weight measurement to the processor 12 of the contents of the bag 26 (i.e. the items 28a, 28b, 28c, and 28d). In order to scan the items 28a, 28b, 28c, and 28d, one of the items must be read by the scanner 18. Additionally, when the item is scanned, the default timer may start.

In FIG. 2B, one of the items 28b is shown removed from the bag 26 in order to scan the item 28b after the bag 26 has been placed on the scale/actuator 16. Particularly, the item 28b includes a bar code, UPC, or the like 29 that is read by the scanner 18. The scale/actuator 16 then indicates to the processor 10 an unstable weight condition. The bar code data is forwarded to the processor 12. When the bar code 29 is read, the scale/actuator 16 obtains a weight measurement of the bag 26. The processor 12 then obtains product data from the storage 30.

In FIG. 2C, the item 28c is returned to the bag 26. The scale/actuator 16 senses a change in weight due to the return of the item 28c into the bag 26, which is shown in the weight indicator 32 on the display 24. The change in weight generates a trigger or actuation signal that is used by the scale/actuator 16 to send the new stable weight to the processor 10. An indication 22, here a visual indication of "Success" on the display, is provided to show successful scaling. If, however, a change in weight has not been sensed by the scale/indicator 16 in the timer period, a measured weight would be used at the expiration of the timer. In a self-checkout system, a security scale (see FIG. 5) may then catch the discrepancy in weight should the item 28b not be returned to the bag 26 in the generous amount of time allowed by the timer, or if fraud is trying to be committed.

Alternatively, as developed more thoroughly below, the scale/actuator 16 is also operative, in another mode, to provide an actuating or trigger signal to the processor 12. The scanner 18 is in communication with the processor 12 and is operative to read machine-readable indicia on an item. The machine-readable indicia may be a bar code such as a UPC (Uniform Product Code), or the like. The scanner is further operative to provide data regarding the machine-readable indicia on the item to the processor 12. The scanner 18 is preferably a continuous read type scanner that is operative to read machine-readable indicia on a continuous basis. The scanner 16 provides scan data to the processor 12 after a valid reading of the bar code. The processor 12, in communication with the storage 30, accesses product databases and look-up tables therein, to ascertain whether a weight must necessarily be obtained for the items, price or pricing information, product information and the like (collectively, product data).

The processor 12 is operative to receive weight measurement(s) from the scale/actuator 16, the bar code data from the scanner 18, product data from the storage 30, program instructions from the memory 14. The processor 12 is further operative to provide an indicator signal to the indicator 22. The indicator signal allows the indicator 22 to provide an audio and/or visual indication to a user of the retail terminal 10 that there has been successful scaling (i.e. that a successful settled or stable weight has been obtained). Successful scaling will be described in greater detail below. The indicator 22 may be a light, a sound, or a combination of light and sound. The indicator 22 may be a stand-alone device or may be incorporated into another device such as the display 24.

The retail terminal 10 is operative under the program instructions stored in the memory 14 to wait until a specified time to obtain a settled or stable weight or settled weight data/measurement from the scale/actuator 16 regarding an item or items placed thereon rather than at the moment (or very near the moment) that a weight is stable or placed thereon. Particularly, the retail terminal 10 is operative to wait until either a trigger or actuation signal is received to obtain a stable weight measurement or a predetermined time length or duration has elapsed (a timer) after the items have been placed on the scale/actuator 16. The stable weight measurement is then processed according to the product data from the storage 30 and the program instructions. An indication is then made via the indicator 22 when a stable weight measurement is successfully processed.

The trigger or actuator providing a trigger or actuation signal in the embodiment of FIG. 1 is integral with the scale 16. Particularly, in one form, the scale/actuator 16 is further operative to provide an actuation signal when the scale/actuator 16 detects or measures a weight change after an initial weight measurement of items placed thereon. The weight change must be more than trivial in order to avoid insignificant weight changes to trigger an actuation signal. The actuation signal is received by the processor 12, which then obtains a weight measurement or utilizes the current weight measurement from the scale/actuator 16. The final weight measurement represents a settled or stable weight of all items. The weight measurement is then processed accordingly. A weight change may be provided by a user or assistant tapping or otherwise manually triggering the scale.

When items are placed on the scale/actuator 16, a timer is also preferably started via the program instructions. The time length or duration of the timer is adjustable. As such, the timer may be adjusted according to whatever criterion or criteria is deemed appropriate. For example, the timer may be of a length of an average amount of time necessary to lift an object from the scale, scan the object, and return the object back onto the scale. Expiration of the timer provides another trigger or actuation signal to the processor 12 to obtain a settled weight. The timer may thus be used to default the retail terminal 10 into obtaining a settled weight in the case that an actuation signal is not obtained by a weight change.

Referring to FIGS. 2A, 2B, and 2C, an exemplary manner of operation of the principles of the subject invention with respect to the retail terminal 10 of FIG. 1 will be described. In FIG. 2A, a bag 26 of items 28a, 28b, 28c, and 28d, to be purchased is placed on the scale/actuator 16. The items 28a, 28b, 28c, and 28d are typically produce or other items that are sold on the basis of weight. Substantially immediately after the bag 26 is placed on the scale/actuator 16, the scale/actuator 16 provides a weight or weight measurement to the processor 12 of the contents of the bag 26 (i.e. the items 28a, 28b, 28c, and 28d). In order to scan the items 28a, 28b, 28c, and 28d, one of the items must be read by the scanner 18. Additionally, when the bag 26 is placed on the scale/actuator 16, the default timer may start.

In FIG. 2B, one of the items 28b is shown removed from the bag 26 in order to scan the item 28b after the bag 26 has been placed on the scale/actuator 16. Particularly, the item 28b includes a bar code, UPC, or the like 29 that is read by the scanner 18. The bar code data is forwarded to the processor 12. When the bar code 29 is read, the scale/actuator 16 obtains a weight measurement of the bag 26. An indication 32 of the obtained weight may be shown on the display 24. The processor 12 then obtains product data from the storage 30.

In FIG. 2C, the item 28c is returned to the bag 26. The scale/actuator 16 senses a change in weight due to the return of the item 28c into the bag 26, which is shown in the weight indicator 32 on the display 24. The change in weight generates a trigger or actuation signal that is received by the processor 12. An indication 22, here a visual indication of "Success" on the display, is provided to show successful scaling. If, however, a change in weight has not been sensed by the scale/indicator 16 in the timer period, a measured weight would be used at the expiration of the timer. A security scale (see FIG. 5) may then catch the discrepancy in weight should the item 28b not be returned to the bag 26 in the generous amount of time allowed by the timer, or if fraud is trying to be committed.

Figure 3:
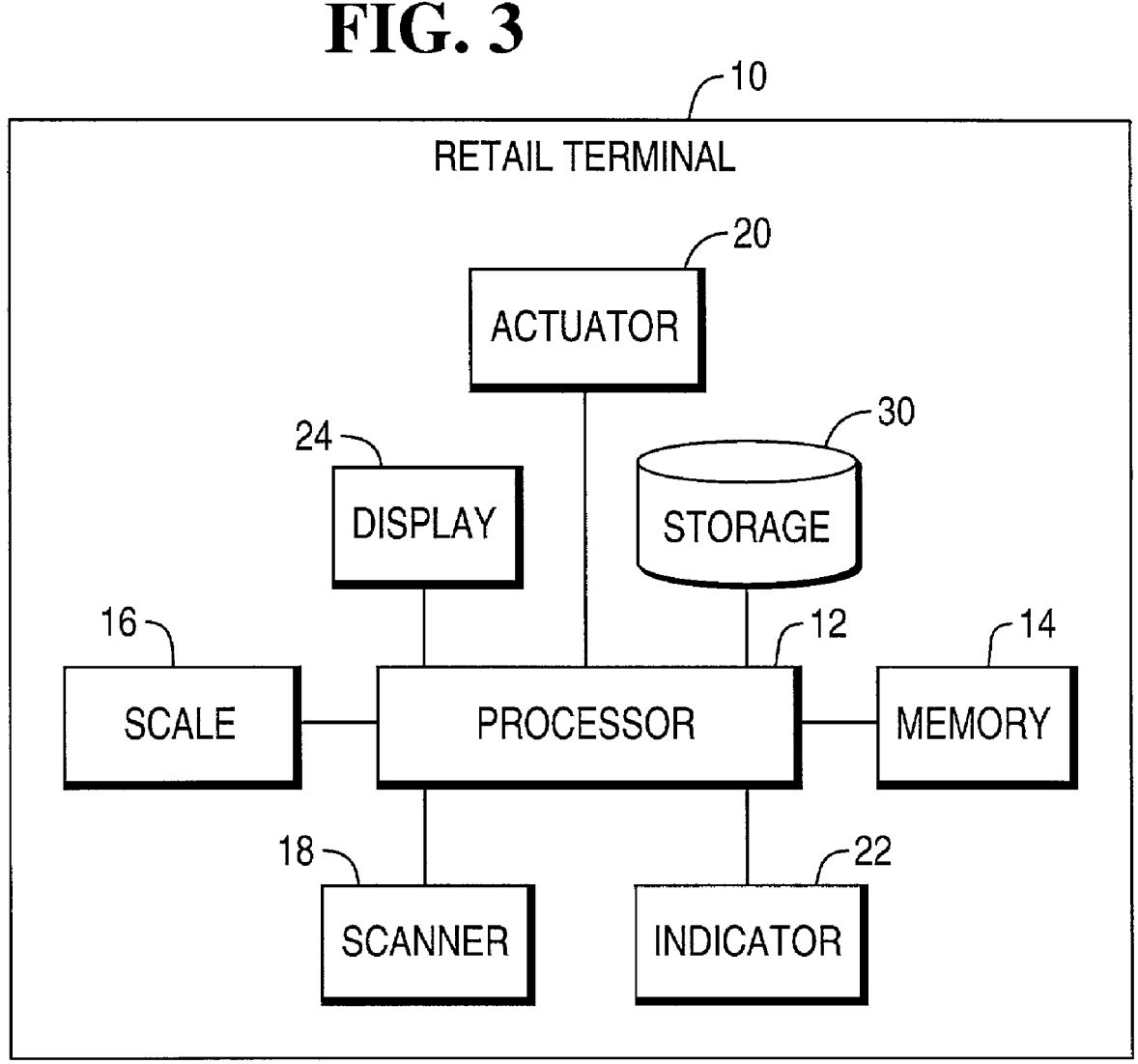
FIG. 3 is a block diagram of an embodiment of another exemplary retail terminal embodying the subject invention.

Referring to FIG. 3, there is depicted a block diagram of another exemplary embodiment of the retail terminal 10. The retail terminal 10 of FIG. 3 includes retail components in like manner, function, and operation to the retail terminal 10 of FIG. 1, with the exception that the scale 16 does not incorporate an actuator or trigger. Instead of an integral scale/actuator, a separate actuator, trigger, or activator 20 is provided. The actuator 20 is in communication with the processor 12. The scale 16 (and the other retail components common to FIGS. 1 and 3) operates in the same manner as those associated with FIG. 1. As well, a default timer may also be provided.

The actuator 20 is operative to provide an actuator or trigger signal to the processor 12 when manually actuated. Manual actuation is provided by a customer or assistant (clerk) in response to a successful scan by the scanner 18 and return to the scale 16. The actuator 20 may be a key on a keypad such as a video touch screen keypad on the display 24 or other keypad mechanism associated with the retail terminal 10. The actuator 20 may be a light beam or switch on the display 24. As well, the actuator 20 may be the same devices or different ones located on the scanner 18. In summation, the actuator 20 may be any type of manually activated device that produces an actuation signal when so activated. The actuation signal is provided to the processor 12. When the processor 12 receives the actuation signal from the actuator 20, a weight measurement is obtained from the scale 16. If, however, the default timer times out before actuation, the processor 12 obtains a weight measurement from the scale 16. The final, stable, or settled weight is processed by the processor 12 in like manner to the retail terminal 10 of FIG. 1.

Figure 4A:
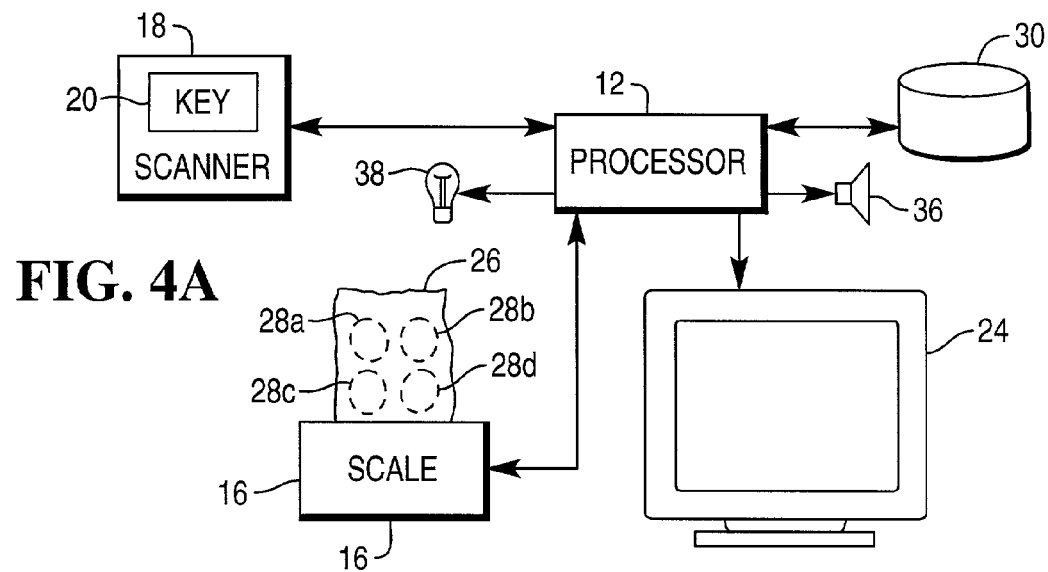
FIG. 4A is a representation of a first step in obtaining a stable or settled weight of a plurality of items considered as one item in accordance with the principles of the subject invention per the embodiment of FIG. 3.
Figure 4B:
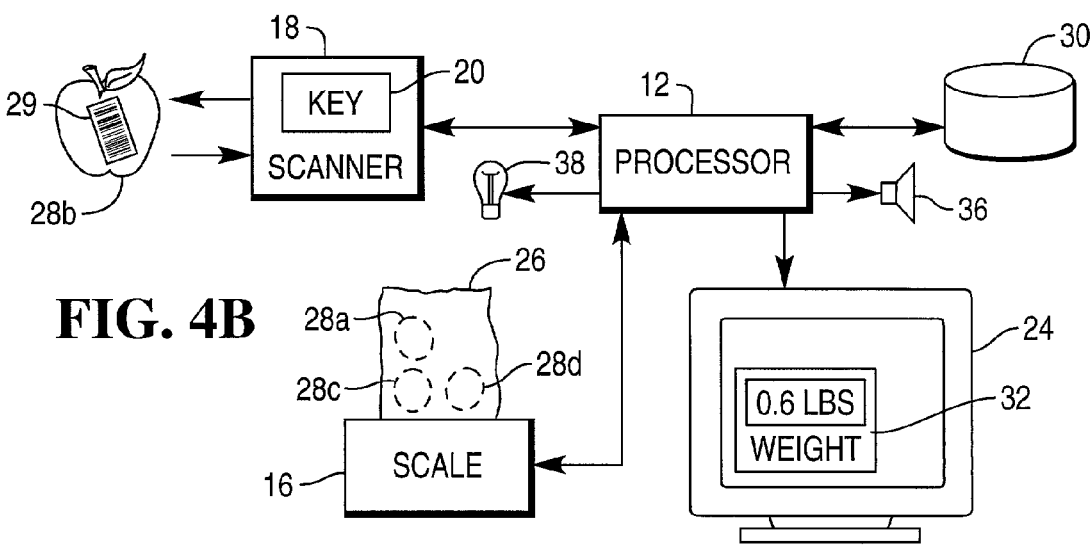
FIG. 4B is a representation of an intermediary step in obtaining a stable or settled weight of a plurality of items considered as one item in accordance with the principles of the subject invention per the embodiment of FIG. 3.
Figure 4C:
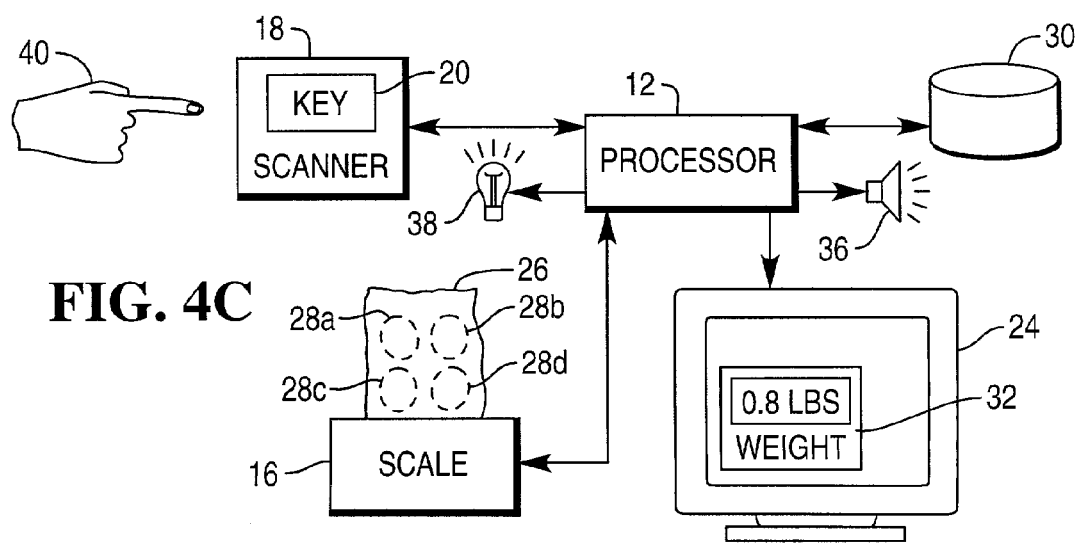
FIG. 4C is a representation of a final step in obtaining a stable or settled weight of a plurality of items considered as one item in accordance with the principles of the subject invention per the embodiment of FIG. 3.

Referring to FIGS. 4A, 4B, and 4C, an exemplary manner of operation of the principles of the subject invention with respect to the retail terminal 10 of FIG. 3 will be described. The retail terminal is shown further including a speaker 36 and a light indicator 38 each of which is in communication with the processor 12. In FIG. 4A, a bag 26 of items 28a, 28b, 28c, and 28d, to be purchased is placed on the scale 16. The items 28a, 28b, 28c, and 28d are typically produce or other items that are sold on the basis of weight. Substantially immediately after the bag 26 is placed on the scale 16, the scale 16 provides a weight or weight measurement to the processor 12 of the contents of the bag 26 (i.e. the items 28a, 28b, 28c, and 28d). In order to scan the items 28a, 28b, 28c, and 28d, one of the items must be read by the scanner 18. Additionally, when the bag 26 is placed on the scale 16, the default timer may start.

In FIG. 4B, one of the items 28b is shown removed from the bag 26 in order to scan the item 28b after the bag 26 has been placed on the scale 16. Particularly, the item 28b includes a bar code, UPC, or the like 29 that is read by the scanner 18. The bar code data is forwarded to the processor 12. When the bar code 29 is read, the scale 16 obtains a weight measurement of the bag 26. An indication 32 of the obtained weight may be shown on the display 24. The processor 12 then obtains product data from the storage 30.

In FIG. 4C, the item 28c is returned to the bag 26. A user, represented by the hand 40, then presses the actuator 20 (here a key on the scanner 18) to indicate that the item 28b has been returned to the bag 26. The scale 16 then obtains a weight measurement of the bag 26, which is shown in the weight indicator 32 on the display 24. An indication (22), here a visual indication by the light 38 and an audio indication by the speaker 36, is provided to show successful scaling. If, however, the key 20 has not been pushed by the hand 40 within the timer period, a measured weight would be used at the expiration of the timer. A security scale (see FIG. 5) may then catch the discrepancy in weight should the item 28b not be returned to the bag 26 in the generous amount of time allowed by the timer, or if fraud is trying to be committed.

Figure 5:
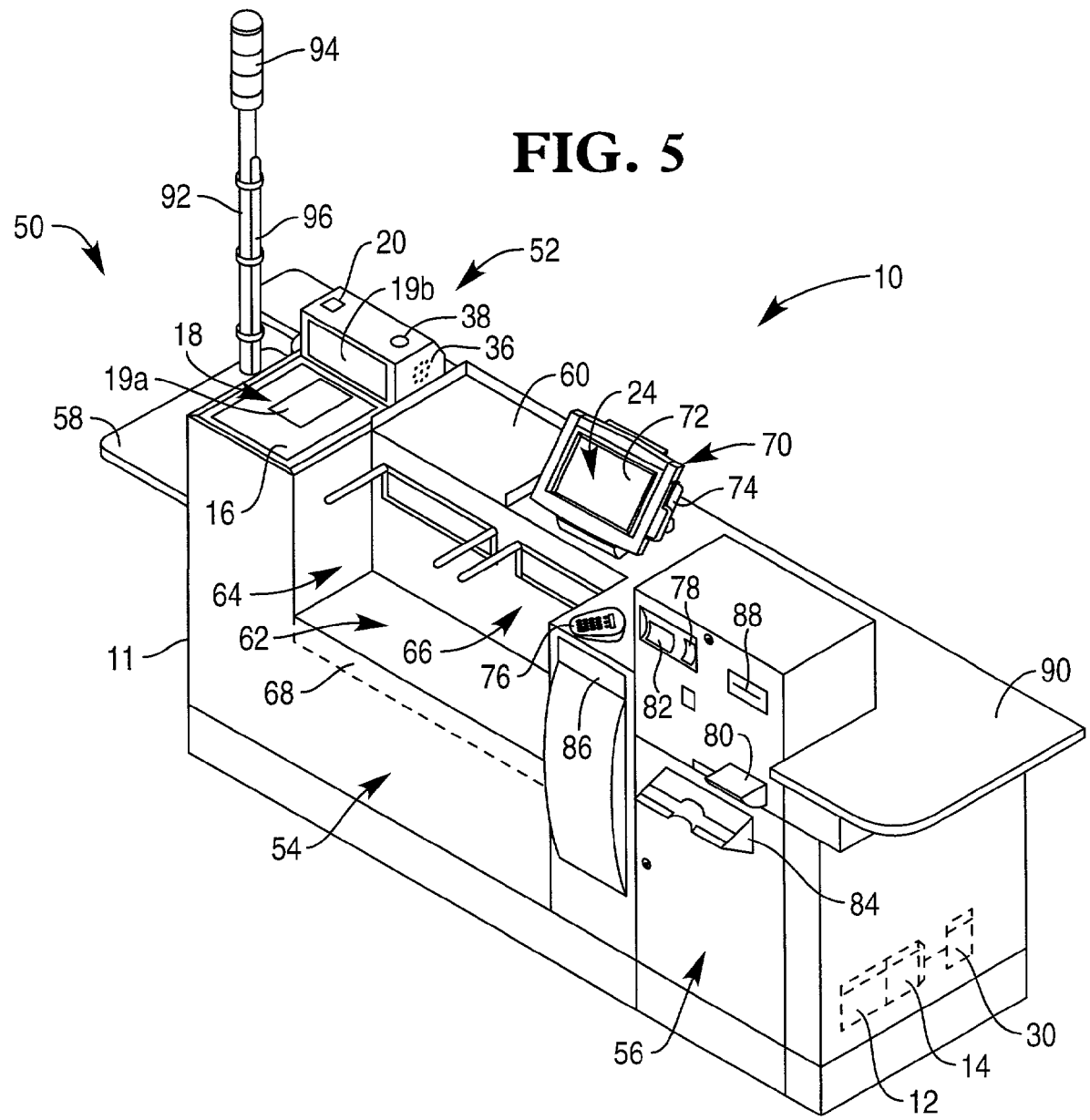
FIG. 5 is a perspective view of an exemplary retail terminal embodied as a self-checkout embodying the subject invention.

Referring to FIG. 5, there is depicted a retail terminal (such as a self-service checkout or self checkout system, i.e. SCOT) generally designated 10 representing the retail terminal 10 previously discussed in which the subject invention may be utilized. The retail terminal 10 includes housing 11. Typically the retail terminal 10 is within a retail store such as a grocery store.

The retail terminal 10 is configured to perform a number of retail functions such as unassisted or "self-service" checkout functions. What is meant herein by the term "self-service checkout functions" or "self-service checkout transaction" or "self-service purchase transaction" are those checkout functions or transactions that are performed by a checkout system by the customer himself or herself without the assistance of a clerk or other personnel employed by the retailer. For example, a self-service checkout (purchase) function or transaction would be performed on the retail terminal 10 in response to a customer himself or herself scanning or otherwise entering items for purchase into the checkout system, and thereafter depressing a payment key on the checkout system that indicates the manner by which the customer intends to pay for such items (e.g. by interaction with a credit/debit card reader or currency acceptor). Accordingly, what is meant herein by the phrase "self-service mode of operation" is a configuration of the retail terminal 10 that allows the system 10 to perform a self-service checkout (purchase) function or transaction.

In addition, what is meant herein by the term "customer" or "consumer" (in the context of the subject invention) is a person who enters a retailer's store, selects his or her items for purchase from the shopping area of the store, checks out his or her items for purchase at a checkout system such as the retail terminal 10 (including tendering payment for his or her items for purchase), and then exits the store subsequent to tendering payment. Hence, as used herein, a customer or consumer is distinguished from retail personnel such as a checkout clerk or other employee of the retailer in that a customer or consumer enters the place of business for the purpose of purchase items from the store. Moreover, what is meant herein by the term "retail personnel" is a person that is employed by the retailer to perform a retail activity such as assistance in operation or other function of the retail terminal 10. Also, the term "user" is herein used to refer to any operator of the retail terminal 10. Accordingly, a user may be retail personnel, a customer or consumer, or any other person who operates the retail terminal 10.

The retail terminal 10 includes a housing 11 that defines a pre-scan area 50, an itemization area 52, a bagging area 54, and a payment area 56. The pre-scan area 50 includes a shelf 58 on which a customer may place a shopping basket (not shown) or items for eventual scanning. In particular, the pre-scan area 20 provides a place where the customer can place items for purchase before scanning. It should be appreciated that the shelf 58 is only representative of a pre-scan area wherein a customer may place items for purchase.

The itemization area 52 of the retail terminal 10 includes the scanner 18 and the produce scale 16. The scanner 18 conventionally scans or reads a product identification code such as a Universal Product Code (UPC), industrial symbol(s), alphanumeric character(s), or other indicia associated with an item to be purchased. One scanner that may be used in the subject invention is a model number 7875 bi-optic scanner that is commercially available from NCR Corporation of Dayton, Ohio.

The scanner 180 includes a first scanning window 19*a* and a second scanning window 19*b*. The first scanning window 19*a* is disposed in a substantially horizontal manner, whereas the second scanning window 19*b* is disposed in a substantially vertical manner. The horizontal or first scanning window 19*a* is disposed in a relatively flush-mount arrangement with the produce scale 16 such that the produce scale 16 is integrated with the scanner 18. If an item such as produce is placed upon the produce scale 18 or the first scanning window 19*a*, the produce scale 18 may be used to determine the weight of the produce (item).

The scanner 18 includes a light source (not shown) such as a laser, a rotating mirror (not shown) driven by a motor (not shown), and a mirror array (not shown) such as is conventional in the art. In operation, a laser beam from the laser reflects off the rotating mirror and mirror array to produce a pattern of scanning light beams. As the product identification code on an item is passed over in front of the scanner 18, the scanning light beams scatter off the product identification code and are returned to the scanner 18 where they are collected and detected. The reflected light is then analyzed electronically in order to determine whether the reflected light contains a valid code pattern. If a valid code pattern is detected or present, the product identification code may then be utilized to retrieve product information associated with the item (e.g. the price of the item, product description, or the like). This information or code data is forwarded to the processor 12. The scanner 18 (or the scanner housing) also includes an activator 20 (in the case the produce scale is not an integral scale/actuator), the speaker 36 for providing sound, and the light 38 as the indicator 22. The scale 16 is operative in the manner set forth above. The itemization area 52 also includes a post-scanning or set-aside area or shelf 60 on which a customer may place items before being bagged as described below in conjunction with the bagging area 54.

The bagging area 54 includes a bagwell 62 that is of sufficient size to accommodate a first bag holder/bagging area 64 and a second bag holder/bagging area 66. The first and second bag holder/bagging areas 64 and 66 each are adapted to retain a plurality of paper and/or plastic bags (not shown) for holding scanned items to be purchased. The bagwell 62 is configured such that a bag and its contents (items scanned for purchase) rest upon a security scale 68. The security scale 68 is a weight scale that monitors the weight of items placed into a bag located in the bagwell 62. Such monitoring during a checkout transaction is particularly useful to prevent improprieties during the checkout transaction.

Particularly, the security scale 68 is utilized to monitor the ingress and egress of items into and out of the bagging area 54. More particularly, the security scale 68 is utilized to detect placement of items into and out of the bag wells 64 and 66. Such item movement monitoring may be utilized to determine if the customer is unintentionally or intentionally committing an impropriety such as theft. For example, a control signal is generated when the scanner 18 successfully captures a product code associated with an item being entered into the retail terminal 10. The security scale 68 may be used to detect placement of an item into the bagging area 54 instead of being scanned by the scanner 18 in the itemization area 52. Moreover, when an item is scanned with the scanner 18 and thereafter placed into a bag in the bagwell 64 or 66, the detected weight of the item (as detected by the security scale 68) may be compared to a known weight value of the item that is stored in a database in the storage 30 in order to confirm that a different, more expensive item was not substituted for the scanned item or the settled or stable weight obtained by the produce scale 16 in the manner of the principles of the subject invention. It should be appreciated that the database may be in the form of a master database that includes every item sold by the retailer, or may be a "transaction level" database that is constructed locally at the retail terminal 10 during operation thereof.

The retail terminal 10 also includes a user interface terminal 70 for receiving input from and providing information to a customer. In particular, the retail terminal 10 includes an interactive customer interface terminal 70. The interactive customer interface terminal 70 includes a display monitor 24 that is provided to display retail information to the customer during operation of the retail terminal 10. For example, transaction information such as item price, item description, total amount of the transaction, instructions, weight on the scale 16, etc. is displayed to the customer via the display monitor 24 during operation of the retail terminal 10. Moreover, instructions may be displayed on the display monitor 24 that assist or otherwise guide the customer through operation of the retail terminal 10.

Additionally, customer-specific messages may be displayed to the customer on the display monitor 24 at certain times during a checkout transaction. What is meant herein by the term "customer-specific" in regard to messages is a retail message that is customized for a given customer based on the purchasing habits or other information that is unique to the customer. For example, a customer-specific message may include a customer-specific advertisement that advertises a product that was purchased by the customer during a previous visit to the retailer's store. The retail terminal 10 is configured to retrieve information from a customer profile database that contains information about each of the retailer's customers. Moreover, a customer-specific message may include a customer-specific advertisement that advertises a product that may be used in conjunction with a product that was previously scanned or otherwise entered into the retail terminal 10 during the current checkout transaction. As well, the customer-specific message may indicate that the customer needs to deactivate a detected EAS tag.

The display monitor 24 of the interactive customer interface terminal 70 preferably incorporates a known touch screen monitor 72 that can generate data signals when certain areas of the screen are touched by a customer. Hence, the display monitor 24 may be utilized by the customer to input information into the retail terminal 10. For example, the customer may manually enter retail information such as item codes and quantities into the retail terminal 10 by use of the touch screen 72 associated with the display monitor 24. The customer may indicate his or her preferred method of payment (e.g. cash, credit card, or debit card) by touching the appropriate area of the touch screen 72 associated with the display monitor 24. A portion of the touch screen 72 associated with the display monitor 24 may also be used as a signature capture area wherein a stylus 74 is used to input a customer's signature in the case of a credit card purchase or other type purchase requiring a signature.

The payment area 56 of the retail terminal 10 includes the system components necessary to allow a customer to perform retail finalization functions such as tendering payment for his or her items for purchase and printing of purchase transaction receipts. In particular, the payment area 56 of the retail terminal 10 includes an electronic payment terminal 76 having a card reader and keypad, a pair of currency acceptors such as a coin acceptor 78 and a bill acceptor 80, a corresponding pair of currency dispensers such as a coin dispenser 82 and a bill dispenser 84, and a receipt printer 86. As shown in FIG. 1, the system components associated with the payment area 56 are positioned to face the customer.

The system components associated with the payment area 56 of the retail terminal 10 are provided to allow the customer to tender payment for his or her items for purchase. In particular, once the customer has entered all of his or her items for purchase into the checkout terminal 10 during a self-service checkout/purchase transaction, the components associated with the payment area 56 are utilized to complete the self-service checkout/purchase transaction by (1) allowing payment to be tendered by either insertion of currency into a currency acceptor (i.e. the coin acceptor 78 and/or the bill acceptor 80), charging a credit card or debit card account, or decreasing a value amount stored on a smart card, cash card, or gift certificate card via the electronic payment terminal 76, and (2) printing a purchase transaction receipt with the receipt printer 86. In the case of when a customer inserts currency into the coin acceptor 78 and/or the bill acceptor 80, the retail terminal 10 may provide change via the coin dispenser 82 and/or the bill dispenser 84. The payment area 56 also includes a coupon acceptor 88 that is adapted to receive coupons. The coupon acceptor 88 is operative to read indicia on a coupon to determine if the coupon has expired, the amount, and to correlate whether an item corresponding to the coupon has been scanned for purchase. At the end of the payment area is a set-aside shelf 90. The set-aside shelf 90 may be used for various purposes such as putting aside bread before placing the same into a bag until the bag is essentially full with heavy items.

The retail terminal 10 also includes an accessory pole 92 that supports a status light device 94, and an antenna/paging device 96. The accessory pole 92 may also support a camera (not shown). The status light device 94 and the antenna/paging device 96 are provided in order to notify store personnel, such as a customer service manager, if intervention into the current checkout transaction is needed. In particular, if during operation of the retail terminal 10, an intervention-needed activity is detected, the status light device 94 and/or the antenna/paging device 96 are operated so as to summon retail personnel, such as the customer service manager. What is meant herein by the term "intervention-needed activity" is (1) activity by the customer or retail personnel in which the retail terminal 10 is unintentionally operated improperly, (2) activity by the customer or retail personnel in which it can be inferred with a high degree of confidence that the retail terminal 10 is intentionally operated improperly for illicit purposes such as theft, (3) activity by the customer or retail personnel in which the customer or retail personnel operates an input device associated with the retail terminal 10 in a manner that indicates the he or she is in need of assistance, and (4) activity by the components associated with the retail terminal 10 that has rendered the system in need of maintenance or other type of service.

An intervention-needed activity may take the form of a security-breach activity in which the retail terminal 10 is being operated in a manner that is placing the retailer in a position of potential financial loss due to goods being taken from the store without having first been paid for (either intentionally or unintentionally), less than all the goods being weighed in the case of produce that results in a false total price for the produce, or a non-security-breach activity in which the customer is in need of assistance or the retail terminal 10 is in need of maintenance, but wherein the retailer is not at risk of financial loss due to goods being taken from the store without having been paid for first. The retail terminal 10 may also have a video monitoring system (not shown).

Figure 6:
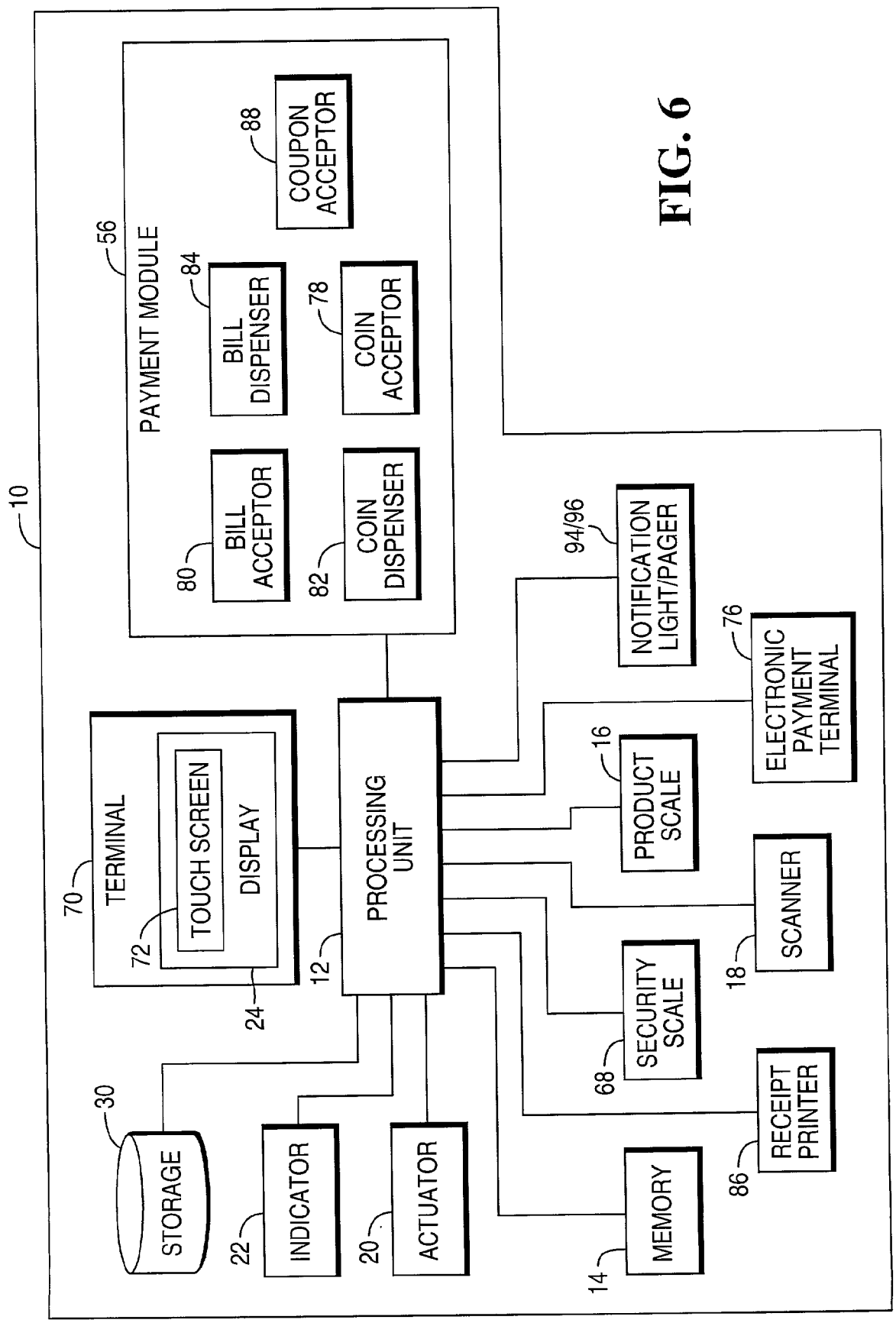
FIG. 6 is a block diagram of the exemplary self-checkout of FIG. 5 in accordance with the principles of the subject invention.

Referring to FIG. 6, the retail terminal 10 is shown in block diagram form. The processing unit or processor 12 of the retail terminal 10 is in communication with the payment module 56. The payment module 56 encompasses the bill acceptor 80, the bill dispenser 84, the coin acceptor 78, the coin dispenser 82, and the coupon acceptor 88. The processing unit 12 receives input from and essentially controls the payment module 56 (the various components thereof) via software (program instructions) stored in memory 14. Additionally, the processing unit 12 is in communication with the receipt printer 86, the security scale 68, the scanner 18, the produce scale 16, the electronic payment terminal 76, the notification light/pager 94/96, and the terminal 70 including the display 24 and touch screen 72. The processing unit 12 is further in communication with the actuator 20, the indicator 22 and the storage 30. The processing unit 12 is also in communication with the memory 14. The memory 14 is operative to store program instructions for operation of the various components of the retail terminal 10.

Figure 7:
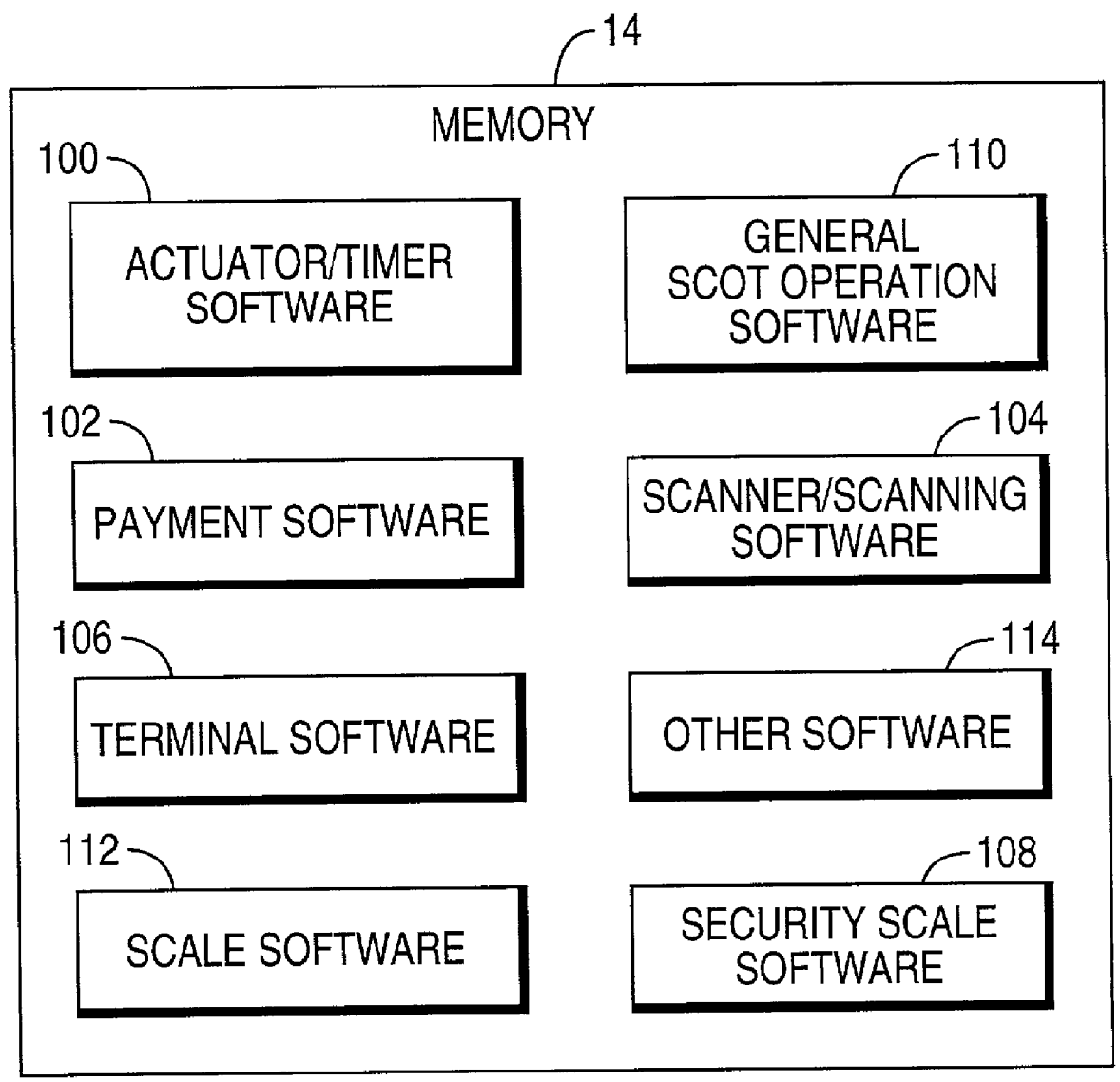
FIG. 7 is a block diagram representation of the memory of the self-checkout of FIG. 5 illustrating various software and/or software functionality stored therein for the operation of the self-checkout.

Referring additionally to FIG. 7, the memory 14 contains a plurality of software applications (program instructions) for particular aspects of the retail terminal 10. In particular, the memory 14 contains actuator/timer software 100, payment software 102, scanner/scanning software 104, terminal software 106, security scale software 108, general retail terminal operation software 110, scale/actuator software 112, and other software 11 (encompassing all other software necessary to operate the retail terminal 10 and/or perform all necessary functions thereof not specifically mentioned). All of the software is operative to operate in conjunction with all of the other software to the extent necessary to interact with the various components of the retail terminal in order to accomplish the required objectives.

The actuator/timer software 100 is operative to allow control of the operation and/or functionality of the actuator/trigger and timer for the subject invention in conjunction with the scale software 112. Particularly, the actuator/timer software 100 is operative to monitor the actuator 20 for an actuator or trigger signal in order to obtain a stable weight from the scale 16. The actuator/timer software 100 is also operative to provide the default timer that provides a time duration to wait for an actuation or trigger signal, and provides the ability to set the time duration (i.e. a maximum time delay) to wait for the trigger.

The payment software 102 is operative to allow control of the operation and/or functionality of the various components of the payment module 56 and control of the operation and/or functionality of the electronic payment terminal 76. In the case of payment for the purchase in cash or currency, the payment software 102 is operative to allow the collection of currency via either or both the bill acceptor 80 and/or the coin acceptor 78. In the case of payment by credit card, debit card, smart card, store card, or the like, the payment software 102 is operative to allow the collection of data from the card via the electronic payment terminal 76, obtain any necessary authorization, and conclude the transaction.

The payment software 102 is also operative to control the coupon acceptor 88 and calculate the total amount due for the particular purchase transaction with or without coupons. The receipt printer 86 is under control of the payment software to provide a paper receipt of the purchase transaction. Alternately or in addition to the paper receipt, the retail terminal 10 may compile a digital receipt.

The scanner/scanning software 104 is operative to control the operation and/or functionality of the scanner 16. This includes operation of the mechanics of the scanner 16 as well as the reading of the product codes/data from an item or product, and any necessary correlations (i.e. database lookups and the like) of data regarding the product to process the purchase transaction.

The terminal software 106 is operative to drive or operate the terminal 70 including the display 24 and touch screen 72 as appropriate, as well as obtain information input to the retail terminal 10 via the terminal 70 (i.e. the display 24 or touch screen 72). When the terminal 70 is in a signature capture mode, the terminal software 106 is operative to obtain the signature input on the touch screen 72, digitize the obtained signature, and process the obtain digital signature as appropriate.

The security scale software 108 is operative to drive or operate the security scale 68. In particular, the security scale software 108 is operative to obtain a weight of a bag and its contents after an item has been scanned. The bag weight is used to correlate the item scanned with the item bagged.

The scale/actuator software 112 is operative to drive or operate the produce scale 16 and the actuator if integral therewith. In particular, the produce scale software 112 is operative to obtain a weight of an item such as produce when placed thereon in the manner described above. The produce scale software 112 may provide a trigger signal as described above.

The general retail terminal operation software 110 and the other software 114 are operative to provide all other operations and/or functionality of the retail terminal 10 not specifically mentioned with respect to the other software, but necessary and/or appropriate for operation of the retail terminal 10.

Operation

Figure 8:
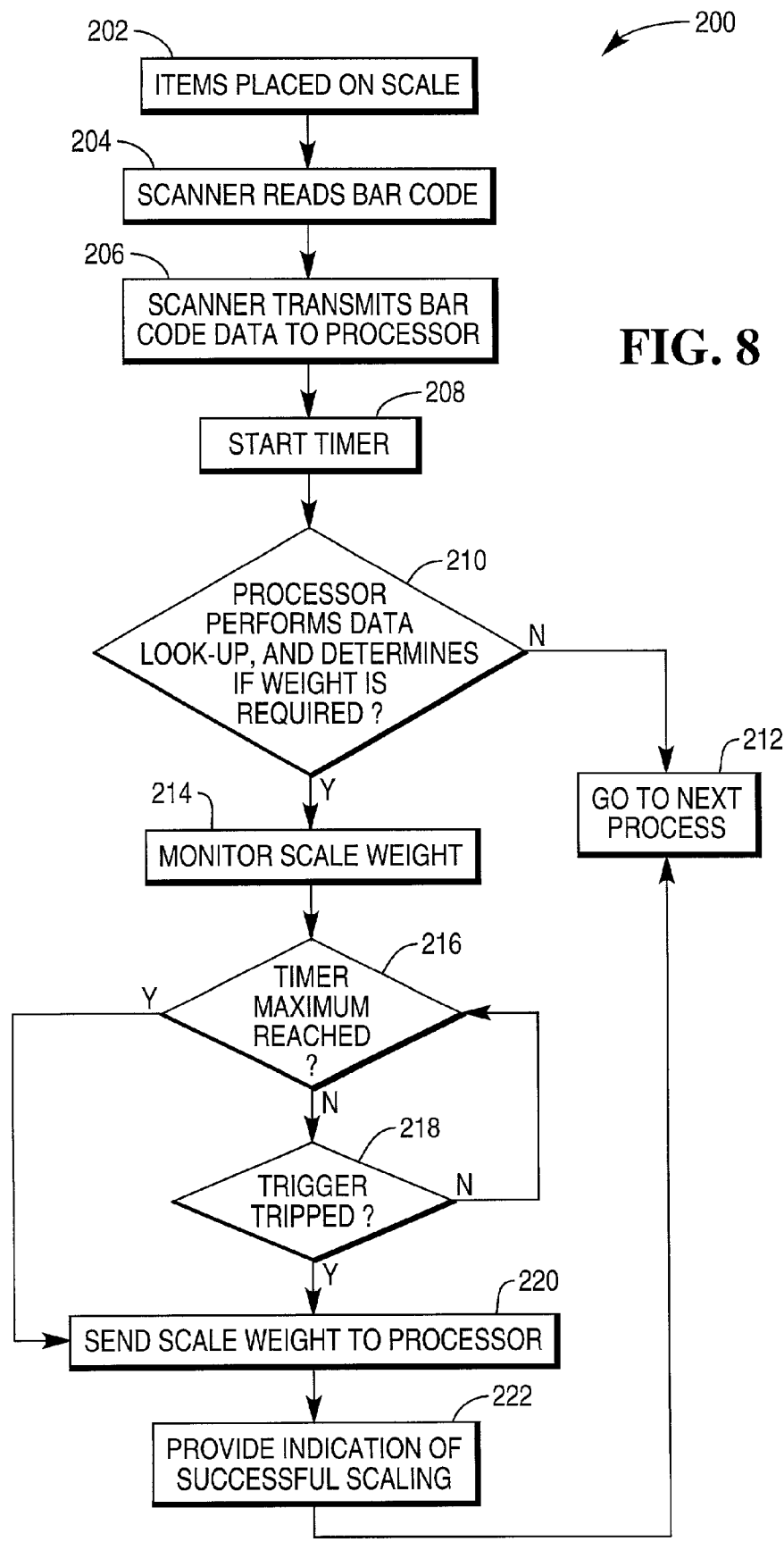
FIG. 8 is a flowchart of an exemplary manner of operation of the subject invention.

Referring to FIG. 8, there is depicted a flow chart, generally designated 200, of an exemplary manner of operation of an aspect of the subject invention. In particular, there is depicted the flow chart 200 of an exemplary manner of weight or scale monitoring. It should be appreciated that the manner of operation described below in conjunction with the flow chart 200 is only an example of one manner or mode in which the retail terminal 10 may implement the subject invention.

In step 202, items such as a bag or container of items are placed on the scale. After placing the items on the scale, the scanner is used in step 204 to read the bar code (or other machine-readable indicia) on one item that has typically been removed from the bag. In step 206, the bar code data obtained by the scanner is forwarded to the processor. At this point the default timer is started, step 208.

In step 210, the processor performs data look-up from storage and determines from the data look-up whether item weight is required. If item weight is not required ("No"), then it is on to the next process, step 212. If item weight is required ("Yes"), then the scale weight is monitored, step 214. In step 216, it is determined whether the default timer maximum has been reached (i.e. has the timer period expired). If the timer period has expired ("Yes"), then a weight is obtained by the scale and is provided to the processor, step 220. If the timer period has not expired ("No"), then it is determined if the trigger has been tripped (actuated), step 218.

If the trigger has not been tripped ("No"), then there is a loop back to step 216 to determine if the default timer has expired (timer maximum reached). This loop continues until either the default timer expires or the trigger is tripped. If, in step 218, the trigger has been tripped ("Yes"), the scale weight is provided to the processor, step 220.

After the weight on the scale has been sent to the processor, step 220, an indication of successful scaling (obtaining of weight of item(s) on the scale) is provided to the user, step 222. Thereafter, the operation proceeds to the next process, step 212.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A method of operating a retail terminal comprising the steps of:

placing items of a type of items to be weighed on a scale of the retail terminal;

scanning one item of the type of items via a scanner of the retail terminal;

obtaining a first weight measurement of the items of the type of items on the scale upon successful scanning of the one item of the type of items;

initiating a timer after the step of obtaining a first weight measurement, the timer having a time duration; and obtaining a second weight measurement of the items of the type of items on the same scale utilized in the obtaining a first weight measurement step upon actuation of a trigger or the timer reaching the time duration.

2. The method of claim 1, wherein actuation of a trigger comprises sensing a change of weight on the scale.

3. The method of claim 1, wherein actuation of a trigger comprises user-actuation of an actuator.

4. The method of claim 3, wherein actuation of a trigger comprises user-actuation of an actuator comprising a key of the retail terminal.

5. The method of claim 1, further comprising the step of:
providing an indication if the second weight measurement has been successfully obtained.

6. The method of claim 5, wherein the step of providing an indication includes providing one of an audio indication and a visual indication.

7. A retail terminal comprising:
a processor;
memory in communication with said processor and containing program instructions operative to control said processor;
a scale in communication with said processor; and
a scanner in communication with said processor;
said scale operative to obtain a first weight measurement of items of a type of items placed on said scale;
said scanner operative to obtain machine-readable data from one of the items of the type of items;
said processor operative to initiate a timer after said scale obtains the first weight measurement, the timer having a time duration; and
said scale further operative to obtain a second weight measurement of the items of the type of items on said scale upon receipt of a trigger signal or the timer reaching the time duration.

8. The retail terminal of claim 7, wherein said trigger signal is generated by said scale sensing a change of weight.

9. The retail terminal of claim 7, wherein said trigger signal is generated by user-actuation of a trigger.

10. The retail terminal of claim 7, further comprising:
an indicator in communication with said processor, said indicator operative to provide an indication of a successful attainment of said second weight measurement by said scale.

11. The retail terminal of claim 10, wherein said indicator comprises one of an audio device and a video device.

12. A checkout system comprising:
a processor;
a scale in communication with said processor and operative to obtain weight measurement of items placed on said scale;
a scanner in communication with said processor and operative to read bar codes; and
memory in communication with said processor and containing program instructions which, when executed by said processor, causes said processor to:
obtain a first weight measurement from said scale of items of a type of items placed on said scale;
obtain a bar code associated with one of said items of the items of the type of items from said scanner;
initiate a timer after said processor obtains a first weight measurement, the timer having a time duration; and
obtain a second weight measurement from said same scale of items of the type of items placed on said scale upon actuation of a trigger or said timer reaching said time duration.

13. The checkout system of claim 12, wherein said trigger comprises sensing a weight change by said scale.

14. The checkout system of claim 12, wherein said trigger comprises a user-actuated actuator.

15. The checkout system of claim 12, further comprising:
an indicator in communication with said processor, said indicator operative to provide an indication of a successful attainment of said second weight measurement by said scale.

16. The checkout system of claim 15, wherein said indicator comprises one of an audio device and a video device.

* * * * *